United States Patent Office 3,361,830
Patented Jan. 2, 1968

3,361,830
PROCESS FOR MAKING POLYPHOSPHINES
Max van Ghemen and Egon Wiberg, Munich, Germany, assignors to Hooker Chemical Corporation, Niagara Falls, N.Y., a corporation of New York
No Drawing. Filed May 22, 1963, Ser. No. 282,219
9 Claims. (Cl. 260—606.5)

The present invention relates to a process for the preparation of organophosphorus compounds. More specifically, this invention is of a reaction of halophosphines and a metal to make polyphosphines.

There have been numerous successful attempts to synthesize phosphine derivatives and diphosphines of the formula $R_2P$—$PR_2$, however only a very little is known about the synthesis of polyphosphines. Triphosphines ($P_3H_5$) have recently been formed by a spectroscopic method as degradation products of diphosphines (Naturwissenschaften 46, 578 (1959)).

In accordance with the instant invention, a compound of the formula $$R^1{}_nA_1PX_2$$

is contacted with a metal such as mercury, wherein the substituents (a) $R^1$ is selected from the group consisting of hydrogen, halogen, alkyl, alkoxy, aryloxy, and acyloxy;
(b) $n$ represents the number of $R^1$ substituents on the core structure $A_1$ and preferably is from 5 to about 40, being 5 when $A_1$ is phenyl;
(c) $A_1$ is an aryl core, said aryl core substituent being derived from an aromatic hydrocarbon by the removal of hydrogen atoms; and
(d) $X_2$ is bromine.

Likewise, the reaction of a compound of the formula $$R^1{}_n(A_1)_2PX_1$$

and a compound selected from the group consisting of a metal, such as mercury and $PX_3$ wherein $X_1$ is a substituent selected from the group consisting of alkali metals, halogen such as bromine, and $X_3$ is a halogen selected from the group consisting of chlorine, bromine and iodine, said $X_1$ halogen being bromine when mercury is employed as a reactant and said $X_1$ being an alkali metal such as sodium, potassium, lithium, when $PX_3$ is the reactant and the remaining substituents are as defined herein, results in the preparation of similar compounds.

Illustrative examples of the $R^1$ substituent included within the present invention are:

(a) alkyl, usually of one to eighteen and preferably of one to six carbon atoms such as methyl, ethyl, propyl, butyl, octyl, stearyl and the like;
(b) alkoxy, preferably of one to six carbon atoms, such as methoxy, ethoxy, propoxy, butoxy, ethoxyethoxy and the like;
(c) aryloxy, preferably of one to thirty carbon atoms such as phenoxy, diphenoxy, and so forth;
(d) acyloxy, usually of one to forty carbon atoms and preferably of one to six carbon atoms, such as acetoxy, stearoyloxy, and the like;
(e) halogen selected from the group consisting of fluorine, chlorine bromine and iodine; and
(f) hydrogen.

The letter $n$ represents the number of the same or different $R^1$ substituents attached to the core structure $A_1$ and may be of a suitable value depending upon the number of $A_1$ cores present. However, the letter $n$ preferably is from about five to about forty.

Illustrative examples of $A_1$ cores include aryl cores of preferably one to eighteen carbon atoms, such as phenyl, tolyl, salicyl cores and the like.

The reaction temperature employed in accomplishing the process of the instant invention will depend upon the solvent used. Generally the reaction is conducted at the reflux temperature of the solvent. The preferred temperature range is from about 40 degrees centigrade to about 80 degrees centigrade although other temperatures can be used which will not adversely affect the starting The mole ratio of reagents is preferably about 1 mole of the halophosphine to 2 moles of the metal. Other mole ratios can be employed without departing from the invention.

Pressure may be atmospheric, although sub- or super-atmospheric pressures can be used without departing from the invention.

A solvent is conveniently employed. Solvents which do not adversely affect the reaction can be employed, such as aromatic solvents, e.g., benzene, and aliphatic solvents such as amines, chloroform, and the like.

The products prepared by the process of the invention can be described by the formulas $$R^1{}_n(A_1P)_4; \text{ and } R^1{}_n(A_1)_4P_2$$

wherein the substituents are as mentioned herein.

The process is illustrated by the following specific equation, which is not intended to be limiting:

$$4R^1{}_nA_1PBr_2 + 8 Hg \xrightarrow{\text{solvent}} 4Hg_2Br_2 + R^1{}_n(A_1P)_4$$

The compounds produced in accordance with the invention are useful as antioxidants in gasoline and may also be incorporated in small amounts in motor fuels, such as gasoline, which contain lead, to suppress preignition firing.

In order that those skilled in the art may better understand the present invention, the manner in which it may be practiced, the following specific examples are given.

Example 1

$$4C_6H_5PBR_2 + 8Hg \rightarrow (PC_6H_5)_4 + 4Hg_2Br_2$$

14.2 grams (53 millimoles) of phenyldibromophosphine ($C_6H_5PBr_2$) dissolved in 50 ml. of benzene and 50 grams of mercury (Hg) were heated up to the reflux temperature of benzene. The formed precipitate of $Hg_2Br_2$ and the excess Hg were filtered off and recovered. The clear filtrate was then evaporated to dryness by employing a high vacuum. The resulting yellow residue was recrystallized from benzene to yield 5.2 grams of colorless product having a melting point of 151 degrees centigrade and which was identified as $(C_6H_5)_4P_4$.

*Analysis.*—Calculated for: P, 28.7 percent. Found: P, 29.2 percent. Molecular weight calculated: 432.4. Molecular weight found: 441.9.

Example 2

Similarly, in the manner described in Example 1, 14.7 grams of diphenylbromophosphine $(C_6H_5)_2PBr$ and 38 grams of mercury are refluxed in 100 ml. of benzene under a nitrogen atmosphere. A small amount of $Hg_2Br_2$ is formed after six hours reflux indicating conversion to $P_2(C_6H_5)_4$.

Example 3

A solution of 5.70 grams (21.1 millimoles) of $PBr_3$ in 25 ml. benzene was condensed on a deep-frozen suspension of 83.7 millimoles of diphenylsodiumphosphine ($Ph_2PNa$) in benzene. The reaction mixture was gradually heated up to room temperature and a darkening of the solution from yellow to a dark brown occurred, and a brown solid precipitated. The filtrate is evaporated, and the residue purified by recrystallization from benzene and petroleum ether, and finally by a high vacuum sublimation at 150 degrees centigrade. The purified sublimed tetraphenyldiphosphine ($P_2(C_6H_5)_4$) produced melted at 121 degrees centigrade.

*Analysis.*—Calculated: P, 16.8%; molecular weight, 370.4%. Found: P, 16.6%; molecular weight, 363.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A process for the preparation of a compound of the formula $$R^1{}_5(A_1P)_4$$

comprising reacting a compound of the formula $$R^1{}_5A_1PBr_2$$

with mercury, wherein
  $R^1$, which may be the same or different, is selected from the group consisting of hydrogen, halogen, alkyl of 1 to 18 carbon atoms, alkoxy of 1 to 6 carbon atoms, aryloxy of 1 to 30 carbon atoms, and acyloxy of 1 to 40 carbon atoms;
  and $A_1$ is the unsubstituted phenyl nucleus, $C_6$.

2. A process in accordance with claim 1 wherein a temperature of about 30 degrees centigrade to 80 degrees centigrade is employed.

3. A process in accordance with claim 1 wherein $R^1$ is alkoxy of 1 to 6 carbon atoms.

4. A process for the preparation of a compound of the formula:

$$P_4(C_6H_5)_4$$

comprising reacting phenyldibromophosphine with mercury in a molar ratio of one to two.

5. A process for the preparation of a compound of the formula:

$$R^1{}_n(A_1)_4P_2$$

comprising reacting a compound of the formula:

$$R^1{}_n(A_1)_2PX_1 \text{ and } PX_3$$

wherein $X_1$ is an alkali metal, the X of $X_3$ is a halogen selected from the group consisting of chlorine, bromine and iodine, $R^1$, which is the same or different, is selected from the group consisting of hydrogen, halogen, alkyl of 1 to 18 carbon atoms, alkoxy of 1 to 6 carbon atoms, aryloxy of 1 to 30 carbon atoms, and acyloxy of 1 to 40 carbon atoms, $A_1$ is a phenyl nucleus, and $n$ is five.

6. A process in accordance with claim 5 wherein $R^1$ is hydrogen, $PX_2$ is $PBr_3$, and $X_1$ is sodium.

7. A process for the preparation of $P_2(C_6H_5)_4$ comprising reacting phosphorus tribromide with sodium-diphenylphosphine.

8. A process for the preparation of $P_2(C_6H_5)_4$ comprising reacting diphenylbromophosphine with mercury.

9. A process for the preparation of $$P_4(C_6H_5)_4$$

comprising reacting phenyl dibromophosphine with mercury.

References Cited

Issleib et al.: Chemische Berichte, 92 (1959), pp. 2681–2694.

Mahler et al.: Journal of American Chemical Society, 79 (1957), page 251.

Burg et al.: Journal of American Chemical Society, 82 (1960), pp. 3514–3417.

TOBIAS E. LEVOW, *Primary Examiner.*

W. F. W. BELLAMY, *Assistant Examiner.*

UNITED STATES PATENT OFFICE
CERTIFICATE OF CORRECTION

Patent No. 3,361,830

January 2, 1968

Max Van Ghemen et al.

It is certified that error appears in the above identified patent and that said Letters Patent are hereby corrected as shown below:

Column 2, line 7, after "starting" insert -- reagents or the reaction mechanism. --; line 38, "$4C_6H_5PBR_2$" should read -- $4C_6H_5PBr_2$ --. Column 4, line 16, "$PX_2$" should read -- $PX_3$ --.

Signed and sealed this 3rd day of March 1970.

(SEAL)
Attest:

Edward M. Fletcher, Jr.
Attesting Officer

WILLIAM E. SCHUYLER, JR.
Commissioner of Patents